United States Patent [19]

Aughton

[11] Patent Number: 4,659,185
[45] Date of Patent: Apr. 21, 1987

[54] LIGHT BEAM SPLITTER

[75] Inventor: John E. Aughton, London, England

[73] Assignee: Crosfield Electronics Limited, London, England

[21] Appl. No.: 831,673

[22] Filed: Feb. 21, 1986

Related U.S. Application Data

[63] Continuation of Ser. No. 561,116, Dec. 13, 1983, abandoned.

[30] Foreign Application Priority Data

Dec. 21, 1982 [GB] United Kingdom ............... 8236294

[51] Int. Cl.$^4$ ..................... G02B 5/30; G02B 27/14
[52] U.S. Cl. .................................. 350/394; 350/173
[58] Field of Search ............... 350/394, 400–403, 350/169, 171, 172, 173, 381

[56] References Cited

U.S. PATENT DOCUMENTS

| | | | |
|---|---|---|---|
| 3,743,378 | 7/1973 | Bousky | 350/381 |
| 4,084,883 | 4/1978 | Eastman et al. | 350/394 |

OTHER PUBLICATIONS

Chang et al, Light Partitioner, 2-1970, IBM Technical Disclosure Bulletin, vol. 12, No. 9.

*Primary Examiner*—Bruce Y. Arnold
*Attorney, Agent, or Firm*—Sughrue, Mion, Zinn, Macpeak and Seas

[57] ABSTRACT

Apparatus for splitting a light beam into a plurality of parallel beams of equal intensity comprises at least two blocks of isotropic light-transmissive material, each block having one major face, on which the input beam is incident, coated to be partially transmissive, and an opposite parallel major face which is silvered. The blocks are arranged in series so that the input beam, on reaching the first block divides into a reflected part and a transmitted part which enters the block and, after total internal reflection, provides an output beam parallel to the reflected part of the first beam, each subsequent block receiving all parallel beams from the preceding block or blocks. Optical means may be provided in the beam path to ensure that each beam entering each block has equal S- and P- polarization components.

8 Claims, 2 Drawing Figures

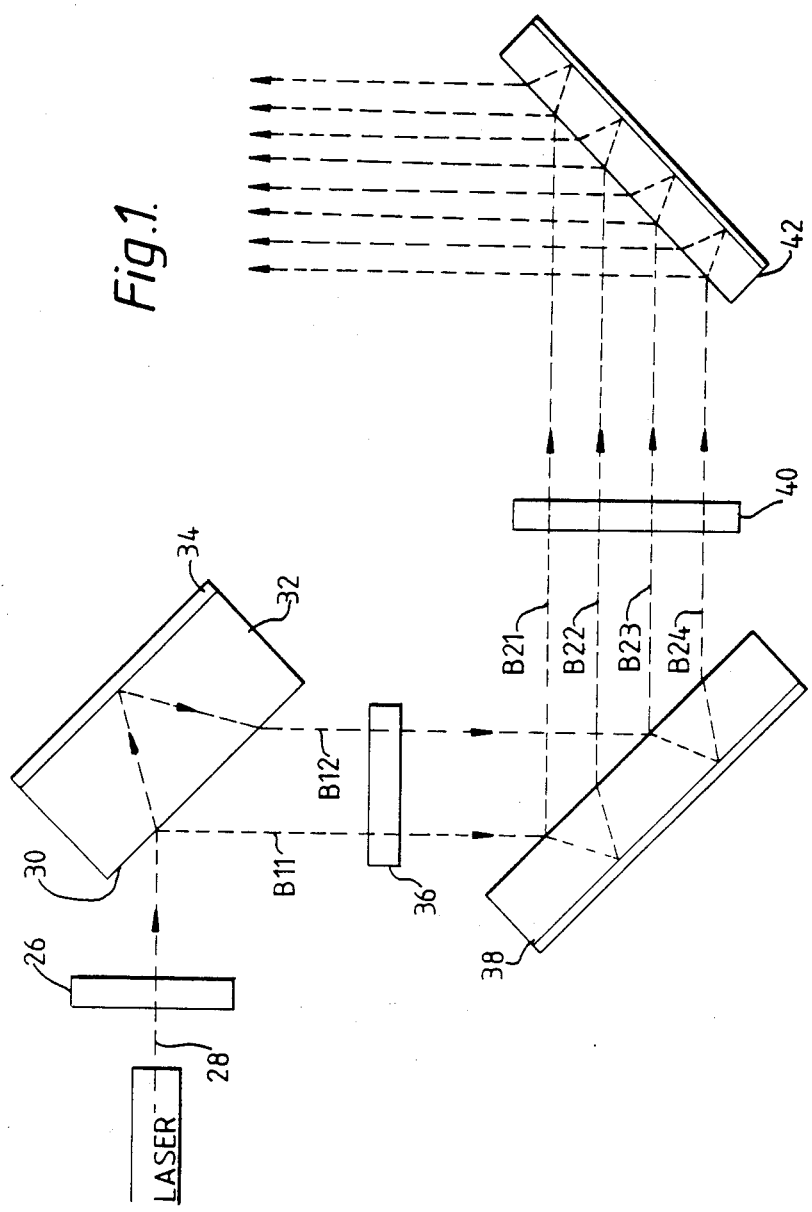

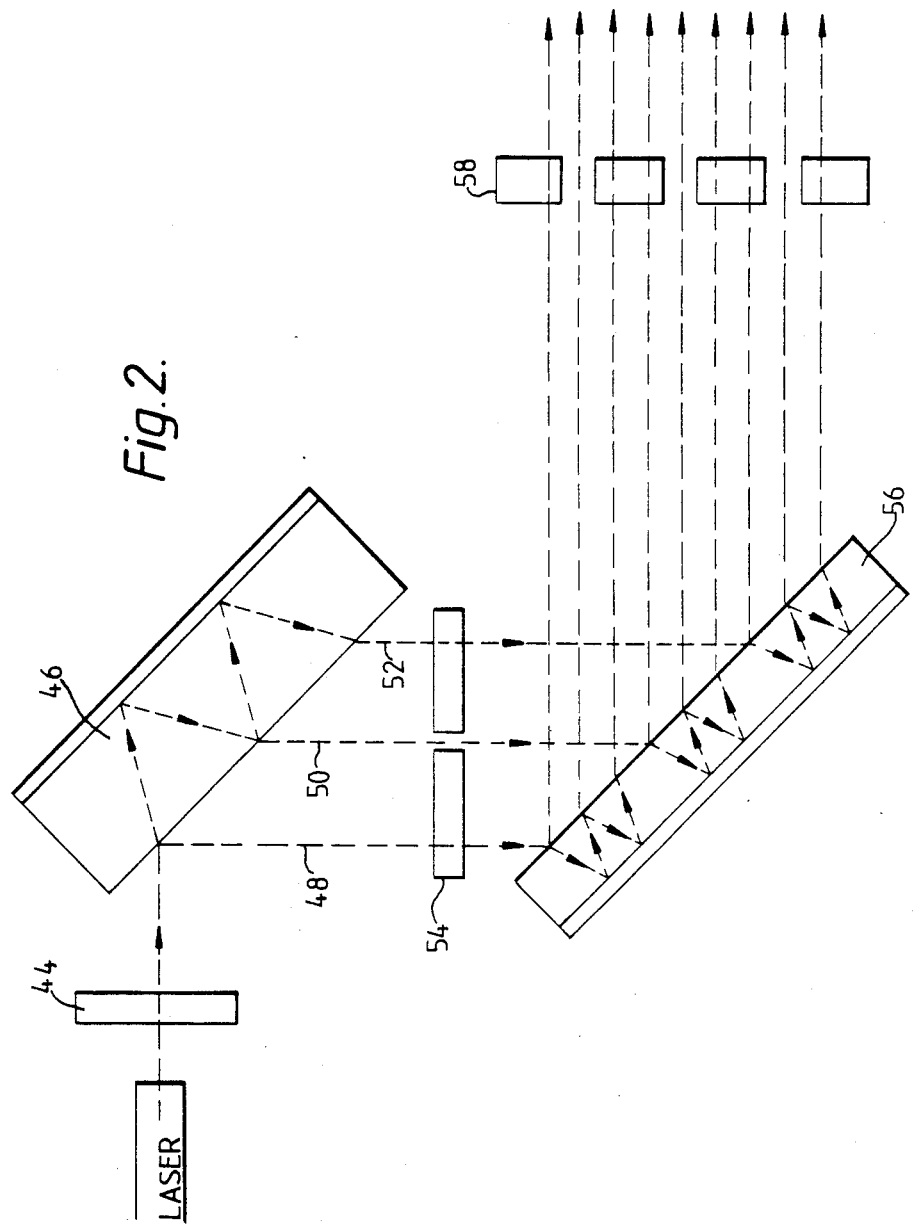

4,659,185

LIGHT BEAM SPLITTER

BACKGROUND OF THE INVENTION

This is a continuation of application Ser. No. 561,116, filed Dec. 13, 1983, now abandoned.

This invention relates to beam splitters for receiving an incident light beam and splitting the beam into several parallel emergent beams. The invention is particularly useful in laser half-tone printing.

In applications such as laser half-tone printing where several, parallel beams are modulated in accordance with a printing signal and are then used to image onto a surface an array of dots, it is often necessary to provide parallel beams of equal intensity and with equal relative spacing. One beam splitter for achieving this result is described in our British Pat. No. 1522555. It consists of a single slab with parallel faces having coatings which vary along the length so as to vary the reflection and transmission coefficients in such a way that at successive internal reflections the transmitted beams emerge parallel and of equal intensity. For eight emergent beams, for example, each face of the slab requires eight differently-coated regions. This beam splitter suffers from the major disadvantage of high cost of manufacture consequent on the need for the opposite faces to be accurately parallel and to receive many coating operations. The effect of the out-of-parallelism is progressive on successive transmitted beams, and therefore increases with the number of emergent beams. Moreover, there is no flexibility in adjustment of the beam splitter in operation. The emergent beams can only be at a designed spacing from each other and cannot be contiguous. It is not possible with such a beam splitter to multiply the number of output beams by arranging a number of like beam splitters in series or cascade, since each beam splitter can only receive one input beam.

SUMMARY OF THE INVENTION

It is therefore an object of the present invention to provide a simple beam splitter which can be manufactured cheaply and which provides flexibility in use.

A triangular prism with two silvered faces and one partially transmissive face which receives one or more input beams and gives rise to two parallel, equally intense beams for each input beam, is described in our copending U.S. patent application Ser. No. 561,117 based on our British patent application No. 8236345.

Apparatus in accordance with the present invention for producing a plurality of parallel light beams of substantially equal intensity from a single input beam comprises: a light source producing a collimated monochromatic light beam which is either totally non-polarized or is polarized with equal S- and P-polarization components; and is characterized by at least two blocks of isotropic light-transmissive material having opposed parallel major faces, each block being silvered on one major face and uniformly coated to be partially transmissive over the other major face; the blocks being positioned in series such that the light beam from the source in a plane normal to both faces strikes the partially-transmissive face of a first block and divides to provide, after internal reflection, a plurality of parallel output beams from the partially-transmissive face which then strike the next block in the series, each such subsequent block receiving the plurality of parallel beams and, by dividing and internal reflection, emitting a greater plurality of parallel beams, the total energy of which is substantially that of the original light beam.

The partially-transmissive coating on each major face is preferably constructed such that, for the designed angle of incidence of the input beam or beams, one of the beams which is fully (i.e. totally) internally reflected in the silvered face is totally transmitted through the opposite coated face, the apparatus further comprising optical means positioned in the beam path between adjacent blocks in the series ensuring that each beam entering each block has equal S- and P-polarization components.

In one preferred embodiment, each flat block gives rise to just two output beams from a given input beam. In this embodiment, an input beam with equal S- and P-polarization components is split by the partially-transmissive surface such that one component is partially reflected and the other component totally transmitted, the said other component finally emerging having undergone full (i.e. total) internal reflection in the silvered face followed by total transmission in the coated surface.

In another preferred embodiment, each block gives rise to three emergent beams, one contains only one polarization component, one contains the opposite polarization component, and the middle beam contains an equal mixture of the two components.

The said optical means positioned in the beam path between successive blocks are preferably either quarter-wavelength retarders producing circular polarization of the light beams or 45° rotators, made of an anisotropic material such as quartz. It is also preferable to have such optical means interposed between the source and the first block of the series unless the source is of the type which produces totally non-polarized light. The source is preferably an argon-ion laser for printing applications, and this type of laser produces polarized light.

BRIEF DESCRIPTION OF THE DRAWINGS

In order that the invention may be better understood two preferred embodiments will now be described with reference to the accompanying drawings of which:

FIG. 1 shows a beam splitter according to the first embodiment, comprising three blocks in series or cascade, each block giving rise to two output beams for each given input beam; and, FIG. 2 shows a second preferred embodiment in which two blocks in series produce nine output beams.

DETAILED DESCRIPTION OF THE PREFERRED EMBODIMENTS

FIG. 1 shows apparatus for producing eight parallel output beams of equal intensity from a single laser beam 28. The laser beam passes through a quarter wavelength retarder of 45° rotator 26 which ensures that the beam reaching a first block 32 has equal S-polarized and P-polarized components. Block 32 has parallel major faces of which one face 34 is coated to give full internal reflection, and the opposite face 30 is coated to be partially transmissive. The coating 34 on the fully internally reflective face is one quarter wavelength thick so as to give a half-wavelength retardation to the reflected beam. The coating 30 on the partially transmissive face is arranged so that for a given angle of incidence it reflects totally the S-polarization component and transmits totally the P-polarization component. The other constraint on the coating of the face 30 is that it transmits totally the P-component reflected in the face 34 to emerge as beam B12. Thus the two parallel output beams B11 and B12 are respectively S-polarized and P-polarized, and as such as of equal intensity.

The beams then pass through a rotator or retarder 36 identical to the previous device 26, to strike the partially transmissive face of a second block 38. The whole process is repeated and gives rise to four parallel output beams B21 to B24 (two S-polarized, two P-polarized), of equal intensity. These four output beams pass through a similar retarder or rotator 40 to strike the partially-transmissive face of another similar block 42, giving rise to the eight required output beams (four S-polarized, four P-polarized).

As shown in FIG. 1, the separation of the output beam can be controlled by the thickness of the blocks. If desired, the overall width of the group of beams emerging from each of the blocks can be made the same, by halving the thickness of each block in succession.

A small degree of fine adjustment, for example 10 to 20%, is allowable by changing the angle of incidence at one or more blocks, to adjust the spacing of the output beams while maintaining their parallelism. The limits of adjustment of the angle of incidence are defined by the tolerance in the equality of intensities of the beams, since their equality is generally determined by the precise angle of incidence and the type of coating on the blocks.

A second embodiment of the invention is shown in FIG. 2, in which each block is arranged to produce three output beams from a given input beam. The complete apparatus includes only two blocks in this example, so that the final number of output beams is nine. Light from a laser passes through a retarder or rotator 44, as described above, and strikes the partially transmissive face of a first block 46. The coating is so arranged that for a given angle of incidence a first emergent beam 48 contains just S-polarized light, a middle output beam 50 contains equal proportions of P- and S-polarized light, and a third output beam 52 contains just P-polarized light. If the input beam has half a unit of intensity of each polarization type, then beam 48 has 0.33 unit of S-polarization, beam 50 has 0.17 unit of P-polarisation and 0.17 unit of S-polarization, and beam 52 has 0.33 unit of P-polarization light. This is achieved by a coating which for S-polarized light gives 67% reflectivity and 33% transmissivity, and for P-polarized light gives zero reflectivity and 100% transmissivity. The fully-reflective coating on the rear face reverses the proportions of P- and S-polarized light; for example, the first beam transmitted into the block has 0.5 unit of P-polarization and 0.17 of S-polarization, but upon reflection in the rear face has 0.17 unit of P-polarization and 0.5 unit of S-polarization light.

The output beams 48 and 52 pass through a retarder or rotator 54 to equalise their S- and P-polarization components and then strike the partially-transmissive face of a second block 56. The beam 50 already has both components when leaving the block 46. The second block acts in the same way as the first block to produce three output polarized beams for each input beam, and the angles are arranged so that the nine output beams are equally spaced. The nine beams, except for the second, fifth and eighth beams which already contain both components, may thereafter pass through a third retarder or rotator 58 to emerge as circularly-polarized beams.

As shown in FIG. 2, the overall width of the group of beams emergent from the blocks can be made equal by arranging that the faces of the blocks are parallel and that their thicknesses are in the ratio 3:1. Any desired spacing of the beams can be achieved by suitably selecting the thickness of the blocks and by determining a suitable angle of incidence. Once the angle of incidence has been selected, only one type of coating will give the required equality of intensities, but a certain degree of fine adjustment of the angle of incidence is permissible.

The preferred form of light beam is an argon-ion laser beam which produces polarized light, but any laser source or other source of monochromatic, collimated light which transmits through the material of the block can be used.

I claim:

1. Apparatus for producing a plurality of parallel light beams of substantially equal intensity from a single input beam, comprising:

light source means producing a collimated monochromatic light beam which is either totally non-polarized or is polarized with equal S- and P-polarization components, and at least two blocks of isotropic light-transmissive material each having opposed parallel major faces, each block being exclusively silvered on one major face and exclusively uniformly coated to be partially transmissive over the other major face;

the blocks being positioned in series and having respective thicknesses as measured between their opposed parallel major faces such that the light beam from the source means in a plane normal to both faces strikes the partially-transmissive face of a first block and divides to provide, after internal reflection, a plurality of parallel output beams from the partially-transmissive face, all of which then strike the next block in the series, each such subsequent block receiving the plurality of parallel beams and, by division and internal reflection, emitting for each received beam a plurality of parallel beams, the total energy of a final plurality of parallel beams being substantially equal to that of the original light beam, and said final plurality of parallel beams being equally spaced apart in a lateral direction.

2. Apparatus in accordance with claim 1, wherein the partially-transmissive coating on the said other major face of each block is constructed such that, for a designed angle of incidence of the input beam or beams, one of the beam components is fully internally reflected in the silvered face and is totally transmitted through the partially transmissive opposite coated face, the apparatus further comprising optical means positioned in the beam path between adjacent blocks in the series for ensuring that each beam entering each block has equal S- and P-polarization components.

3. Apparatus in accordance with claim 1, wherein the partially-transmissive coating on each block is arranged such that, for a given angle of incidence, each block provides two output beams for each input beam; and wherein an input beam with equal S- and P-polarization components is split by the partially-transmissive surface such that one component is partially reflected and the other component totally transmitted, the said other component finally emerging having undergone full internal reflection in the silvered face followed by total transmission in the coated surface.

4. Apparatus in accordance with claim 1, wherein the partially-transmissive coating on each block is arranged such that, for a given angle of incidence, each block provides three output beams for each input beam and, of the three emergent beams, one contains only one polarization component, one contains the opposite polarization component, and the middle beam contains an equal mixture of the two components.

5. Apparatus in accordance with claim 1, wherein a quater-wavelength retarder is placed in the light path between adjacent blocks in the series.

6. Apparatus in accordance with claim 1, wherein a 45° rotator is placed in the light path between adjacent blocks in the series.

7. Apparatus in accordance with claim 1, wherein the light source is a laser.

8. Apparatus in accordance with claim 1, wherein further optical means are positioned in the beam path between the light source means and the first block of the series to ensure that the beam entering the first block has equal S- and P-polarization components.

* * * * *